United States Patent [19]

Brown

[11] 3,824,443
[45] July 16, 1974

[54] REGULATOR CIRCUIT HAVING A CLAMPED REGULATING WAVE

[75] Inventor: Harold J. Brown, Lorain, Ohio

[73] Assignee: Lorain Products Corporation, Lorain, Ohio

[22] Filed: Jan. 5, 1973

[21] Appl. No.: 321,287

Related U.S. Application Data

[63] Continuation of Ser. No. 257,857, May 30, 1972.

[52] U.S. Cl............................ 321/5, 321/7, 321/20, 323/22 C, 323/45
[51] Int. Cl. ........................................... H02m 7/00
[58] Field of Search ..... 321/5, 7, 18, 20, 58, 52–54; 323/8, 18, 22 SC, 45, 50, 81

[56] References Cited
UNITED STATES PATENTS
3,686,560  8/1972  Lutterkort ........................... 321/18

Primary Examiner—William M. Shoop, Jr.

[57] ABSTRACT

A circuit for providing a regulated a-c or d-c output voltage from an unregulated a-c input voltage. A series regulating network is disposed between the regulator input and the regulator output to support the difference between the unreglated input voltage and the regulated output voltage. A shunt regulating network is connected in shunt with the series regulating network to generate a plurality of regulating waves which, together with the input voltage, control the current through and voltage across the series regulating network. Output voltage sensing circuitry controls the phase angle between the input voltage and the regulating waves, as required, to establish and maintain the regulated output voltage.

11 Claims, 12 Drawing Figures

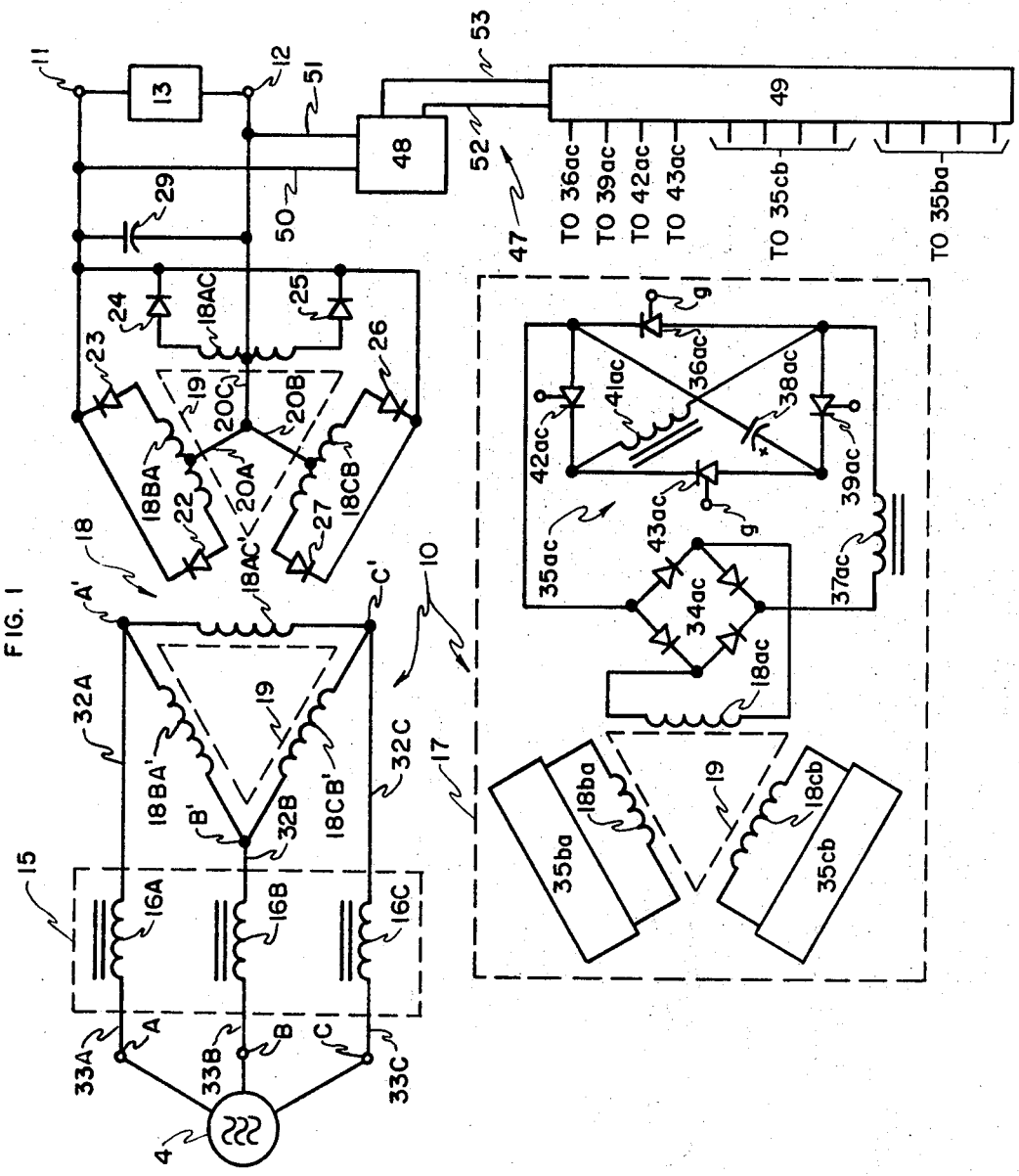

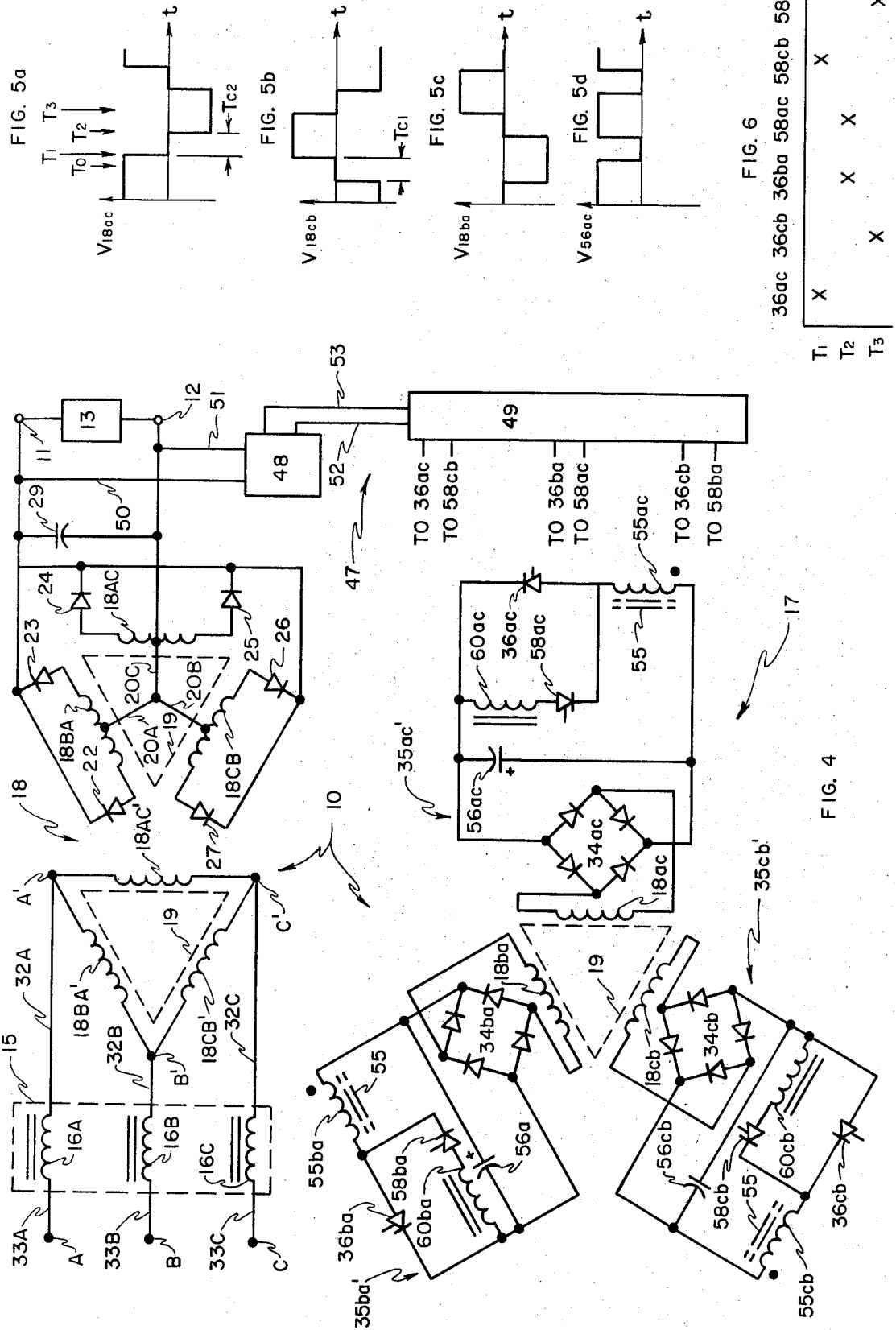

REGULATOR CIRCUIT HAVING A CLAMPED REGULATING WAVE

This is a continuation of application Ser. No. 257,857 filed May 30, 1972.

BACKGROUND OF THE INVENTION

The present invention relates to voltage regulating circuits and is directed more particularly to regulating circuits wherein wave generating circuitry controls the voltage across and current through an inductor to maintain a substantially constant voltage at the regulator output.

Voltage regulator circuits utilizing series-connected inductors in connection with shunt-connected wave generating circuits have long been known and used for the purpose of providing a substantially constant output voltage from a variable a-c input voltage. Early forms of such regulator circuits were known as ferroresonant regulators and utilized wave generating circuits including capacitors and saturable core magnetic units.

Some of the numerous problems presented by ferroresonant circuits include the difficulty of obtaining an output waveform of satisfactory harmonic content, the excessive weight and audible noise associated with the above saturable magnetic units and the excessive size and energy storage of the above capacitors. The volt-amperes of reactive energy stored in a typical ferroresonant tank must, for example, be on the order of twice the volt-ampere rating of the output of the ferroresonant circuit. In addition, these reactive volt-amperes circulate in a tank circuit having hysteresis and copper losses which are substantial in releation to the regulated output power. Accordingly, much effort has been expended in attempting to improve ferroresonant type regulators.

One attempt to improve ferroresonant regulators has involved the substitution of a plurality of series-connected saturable magnetic units for each magnetic unit of earlier circuits. Such a concept is shown, for example, in U.S. Pat. No. 3,092,768 granted to A. Kusko on June 4, 1963. Circuitry of this type entailed the actual storage of reactive energy while the circuit of the present invention will be found to utilize a pulsing concept as distinguished from the oscillation of large reactive currents. By the present invention electrical losses are greatly reduced, excessively large and noisy magnetic units are eliminated. Additionally, the storage of excessively large amounts of energy are not required in the regulating capacitors.

Another attempt to improve ferroresonant voltage regulators has involved the substitution of gate controlled switching devices and linear inductances for the saturating magnetic units. In such circuits the linear inductance simulates the saturated impedance of the saturable magnetic unit and the gate controlled switching devices simulates the on-off conducting characteristic thereof. While the utilization of solid-state circuitry does greatly reduce the weight and audible noise associated with ferroresonant voltage regulators, it does not solve the problem of high harmonic content. Neither do such solid-state circuits allow a reduction in either the size of or the amount of energy stored in the regulating circuit capacitors.

The circuit of the present invention does not utilize the wave generating schemes utilized in ferroresonant type regulator circuits but instead utilizes controllable voltage clamping circuits which employ an entirely different operating principle. These controllable clamping circuits generate regulating waves having a controllable harmonic content. In addition, these controllable clamping circuits are suitable for use in regulating circuits having either a-c or d-c outputs and having loads which are resistive, inductive or capacitive, a feature not available heretofore. Thus, the regulating circuity of the invention eliminates the problems and limitations of prior static voltage regulators and affords advantages not exhibited thereby.

SUMMARY OF THE INVENTION

It is an object of the invention to provide improved voltage regulating circuitry.

Another object of the invention is to provide voltage regulating circuitry including a shunt-connected wave generating circuit which generates a regulating voltage wave of controllable harmonic content.

It is another object of the invention to provide voltage regulating circuitry of the above character which does not utilize saturable magnetic devices or the mere substitution of solid-state means for such magnetic devices.

Yet another object of the invention is to provide a voltage regulating circuit of the above character which utilizes regulating circuit capacitors which are substantially smaller than the capacitors of ferroresonant voltage regulating circuits.

Another object of the invention is to provide a voltage regulating circuit including a regulating wave generating and shaping circuit wherein wave shaping results from the clamping or short-circuiting activity of controllable switching devices.

Yet another object of the invention is to provide a voltage regulating circuit including a shunt-connected wave generating circuit including controllable clamping circuitry for initiating and terminating clamping activity at controllable times to control the voltage across and current through a regulating inductor and thereby maintain a substantially constant output voltage.

Still another object of the invention is to provide a voltage regulator of the above character including commutating circuitry for terminating the clamping activity of the clamping circuitry.

It is another object of the invention to provide voltage regulating circuitry which, when used to afford a regulated d-c voltage, includes controllable clamping circuitry which can initiate or terminate a clamped voltage interval within a time which is short in relation to the period of the a-c input voltage.

Another object of the invention is to provide circuitry in which the amount of stored energy is small in relation to the stored energy of comparably rated ferroresonant circuits and in which the energy which is stored in the commutating circuitry and not used during one commutating event is preserved for use in subsequent commutating events.

It is still another object of the invention to provide voltage regulating circuitry including voltage control means for controlling the time of occurrence and duration of the above clamping activity in accordance with the magnitude of the voltage to be regulated.

DESCRIPTION OF THE DRAWINGS

FIG. 1 is a schematic diagram of one exemplary circuit embodying the invention.

FIGS. 2a, 2b, 2c and 2d show the voltages appearing at selected points in the circuit of FIG. 1 as a function of time.

FIG. 3 is a timing diagram showing the firing sequence of selected circuit elements of FIG. 1.

FIG. 4 is a schematic diagram of a second exemplary circuit embodying the invention.

FIGS. 5a, 5b, 5c and 5d show the voltages appearing at selected points in the circuit of FIG. 4 as a function of time.

FIG. 6 is a timing diagram showing the firing sequence of selected circuit elements of FIG. 4.

DESCRIPTION OF THE INVENTION

Referring to FIG. 1 there is shown circuitry 10 for producing a regulated voltage at the terminals 11 and 12 of a d-c load 13 from the unregulated voltage which a polyphase a-c source 14 establishes at terminals A, B and C. Regulating circuit 10 includes a series regulating network 15 for supporting the difference between the unregulated a-c input voltage at terminals A, B and C and the regulated output voltage at terminals 11 and 12. Regulating network 15 may include inductance means 16A, 16B and 16C which may be wound on a single magnetic core. Regulating circuit 10 also includes a shunt regulating network 17 for controlling the voltage across and current through series regulating network 15, as required, to establish the desired output voltage at the required output current. Finally, regulating circuit 10 includes rectifying means which here takes the form of three parallel-connected full-wave rectifiers including respective windings 18BA, 18AC and 18CB of a three phase transformer 18 having a core 19, respective diode pairs 22-23, 24-25 and 26-27 and respective connected center taps 20A, 20C and 20B. It will be understood that if an a-c output voltage is required, the latter rectifying circuits may be eliminated and the desired output voltage and current may be drawn from windings 18BA, 18AC and 18CB.

Shunt regulating network 17 controls the regulating activity of inductors 16A, 16B and 16C by establishing a set of regulating voltage waves on terminals A', B' and C' of transformer windings 18BA', 18AC' and 18CB', the latter terminals serving as what will hereafter be called regulating terminals. These regulating waves are applied to first respective ends of inductors 16A, 16B and 16C through conductors 32A, 32B and 32C. Since the polyphase input voltages of source 14 are applied to second respective ends of inductors 16A, 16B and 16C through conductors 33A, 33B and 33C respectively, the voltage across and current through the regulating inductors is dependent upon the phase difference between the a-c input voltages generated by source 14 and the regulating voltage waves established by shunt regulating network 17. Consequently, as will be described more fully presently, controlling the phase angle between the regulating voltage waves on regulating terminals A', B' and C' and the a-c input voltages on input terminals A, B and C, controls the voltage between terminals 11 and 12.

As is well known, the sizes and weights of inductors and transformers are dependent upon the peak amplitude and the waveforms of the voltages applied thereto. An inductor to which is applied a voltage waveform having a multiplicity of steps during each half-cycle thereof as, for example, is shown in FIG. 2a, can be made smaller than an inductor to which is applied a squarewave voltage waveform although the fundamental component of the squarewave may be equal to the fundamental component of the multi-stepped waveform. This is because the stepped waveform of FIG. 2a has zero voltage intervals $T_c$ each of which occupies 60° of the stepped waveform thus causing the latter to have no third harmonic component, as does a squarewave. Accordingly, it will be seen that the more closely the location and duration of zero voltage intervals allow the regulating voltage waves on windings 18AC', 18CB' and 18BA' to approach a sinusoidal waveform, the more closely the sizes and weights of regulating inductors 16A, 16B and 16C and transformer 18 will approach their minimum values.

The term "multi-stepped waveform," as used herein, means a waveform each half-cycle of which comprises a series of discrete voltage steps, the locations and durations of the steps being so arranged that they establish a waveform having the desired harmonic content, in the present instance, a minimum harmonic content. For general a-c power applications, the number of voltage steps during a half-cycle will be three or more and will be an odd number such as seven or eleven, the number of steps being equal to the number of discrete voltage values between successive half-cycle zero voltage points such as $Z_1$ and $Z_2$ in FIG. 2b. In the latter Figure, for example, the number of steps per half-cycle is equal to three.

To the end that the harmonic content of the regulating voltage waves may be limited or controlled, shunt regulating network 17 includes three substantially identical voltage clamping networks 35ac, 35cb and 35ba. These clamping networks control the waveform of the regulating voltage waves on regulating terminals A', B' and C' by introducing periodic intervals of zero voltage into the voltages across coupled winding pairs 18ac-18AC', 18cb-18CB' and 18ba-18BA' in a predetermined or programmed sequence, the latter sequence being so arranged that the voltages across these winding pairs have stepped waveforms, in the present instance, the waveforms shown in FIGS. 2a, 2b and 2c. Because voltage clamping networks 35ac, 35cb and 35ba are substantially identical, only the circuitry of network 35ac is shown and it will be understood that remarks made with reference thereto are equally applicable to networks 35cb and 35ba except for 120° operative phase differences made necessary by operation in connection with three-phase source 14.

In the present embodiment, voltage clamping network 35ac includes controllable clamping means 36ac which here takes the form of a thyristor, a full-wave bridge rectifier 34ac, a commutating circuit including an inductor 37ac, a capacitor 38ac and a thyristor 39ac, and a resonant discharge circuit including an inductor 41ac and thyristors 42ac and 43ac.

When clamping thyristor 36ac is turned on by a first control signal, it substantially short circuits windings 18ac and 18AC' (and, therefore, regulating terminals A' and C'), through commutating inductor 37ac and diode bridge 34ac, to initiate the clamped voltage periods $T_c$ shown in FIGS. 2a and 2d. These clamped voltage periods are transmitted by commutating circuit elements 37ac, 38ac and 39ac which serve to turn off thyristor 36ac in response to a second control signal. In accordance with one feature of the present invention, the timing and duration of these clamped periods are controlled in accordance with the output voltage to provide the desired regulating waveshaping and output voltage regulation.

The above resonant discharge circuitry serves to control the polarity of the voltage across capacitor 38ac. This allows capacitor 38ac to reverse polarity, as required, to provide a forward bias to thyristor 36ac when the latter is turning on and to provide a reverse bias to thyristor 36ac when the latter is turning off. This also allows the energy which is trapped in capacitor 38ac after commutation to be recovered for later use.

Diode bridge 34ac allows the clamping and commutating circuitry to establish the desired clamped voltage intervals during either polarity of the voltage across windings 18ac and 18AC', as is clearly shown by a comparison of FIGS. 2a and 2d. Thus, diode bridge 34ac eliminates the need to provide duplicate clamping and commutating networks for respective half-cycles of each regulating wave.

The operation of the voltage clamping circuitry of regulating network 17 will now be described. At time $T_0$ in FIGS. 2a and 2d, the thyristors of clamping network 35ac are non-conducting. Under these conditions, capacitor 38ac is charged to the polarity shown in FIG. 1 and the voltage across regulating terminals A' and C' is at a positive maximum as shown in FIG. 2a. The latter conditions continue until time $T_1$ when firing signals are applied to the gates g of thyristors 36ac and 43ac to initiate anode-cathode conduction therethrough. The conduction of thyristor 36ac causes the voltage across winding pair 18ac-18AC' and across regulating terminals A' and C' to drop substantially to zero, as previously described. At the same time, the conduction of thyristor 43ac initiates a reversal in the polarity of the voltage across capacitor 38ac by conducting a resonant discharge and recharge current through capacitor 38ac in the loop including thyristor 43ac, inductor 41ac, thyristor 36ac and capacitor 38ac. When the capacitor voltage polarity reversal is complete, thyristor 43ac turns off. Thus, after the voltage transition which occurs at time $T_1$, the voltage across regulating terminals A' and C' is substantially zero and the polarity of the voltage across capacitor 38ac is reversed from that shown in FIG. 1.

The above clamped conditions continue until time $T_2$ when firing signals initiate conduction through thyristor 39ac and 42ac. The conduction of thyristor 39ac causes the voltage of capacitor 38ac to be applied in reverse-biasing relationship to thyristor 36ac to terminate the conduction thereof and thereby terminate the clamping activity of network 35ac. Thereafter, the polarity of the voltage across capacitor 38ac reverses a second time as capacitor 38ac resonantly discharges and recharges through the path including thyristor 42ac, inductor 41ac and thyristor 39ac, after which thyristor 42ac becomes non-conducting. Thyristor 39ac conducts somewhat longer to charge capacitor 38ac from winding 18ac and thereby restore to that capacitor the energy dissipated during the turn-off of thyristor 36ac and the above described resonant polarity reversals. It will be understood that because of the short time required for the above described thyristor switching and resonant discharge activity to occur, the voltage transitions at times $T_1$ and $T_2$ appear as step voltage changes in FIGS. 2a and 2d.

After time $T_2$, capacitor 38ac and thyristors 36ac, 39ac, 42ac and 43ac of clamping network 35ac are in the condition which they were in at time $T_0$, as shown in FIG. 2d. Accordingly, it will be seen that the periodic application of firing signals to thyristors 36ac, 39ac, 42ac and 43ac of clamping network 35ac, in the sequence shown in FIG. 3, causes periodic clamped intervals to appear in the voltage across winding 18ac and thereby causes a regulating wave of limited or controlled harmonic content to appear between regulating terminals A' and C'. Similarly, the application of periodic firing signals to clamping networks 35cb and 35ba causes regulating waves to appear between regulating terminal pairs C'-B' and B'-A'.

Because capacitor 38ac is used only for commutating clamping or short-circuiting thyristor 36ac, it may be made substantially smaller than the massive tank capacitors of ferroresonant voltage regulators or their solid-state equivalents. Thus, the circuit of FIG. 1 not only provides improved voltage regulating circuitry having waveshaping activity not found in previously available ferroresonant or solid-state regulating circuits but provides such activity with circuit elements which are physically and electrically smaller than those of other, less effective regulating circuits. Because, in addition, the circuit of FIG. 1 may be made to commutate during a time period which is small in relation to the duration of a half-cycle of each regulating wave, clamping network 35ac may be made to produce more than one clamped interval during each half-cycle of each regulating wave. Thus, each half-cycle of the waveforms across windings 18AC', 18CB' and 18BA' may include a polarity of voltage pulses of durations and spacings which assure the provision of regulating voltage waves of the desired harmonic content.

To the end that the conduction of the thyristors of clamping network 35ac may be controlled, as required, to advance or retard the phase angle between the a-c input voltages and the voltages on regulating terminal pairs A'-C', C'-B' and B'-A', while retaining the regulating wave waveforms shown in FIGS. 2a through 2c, there is provided firing signal generating means 47 which in the present embodiment includes a suitable voltage controlled oscillator 48 and a signal translating circuit 49. Oscillator 48 senses the d-c output voltage through sensing leads 50 and 51 and provides a pulse train of variable frequency on conductors 52 and 53. The latter pulse train has a quiescent frequency which is a whole number multiple of the a-c input voltage frequency when the output voltage is at the desired value and which varies in either direction from that quiescent frequency as the output voltage varies in either direction from the desired value. This wholenumber multiple is preferably equal to the number of steps which are to occur during each half-cycle of each regulating wave. In the circuit of FIG. 1, for example, a half-cucle of each regulating wave consists of three voltage steps and the quiescent output frequency of oscillator 48 should, therefore, be equal to three times the a-c input frequency.

Signal translating circuit 49 serves to apply firing signals to thyristors 36ac, 39ac, 42ac and 43ac, in the sequence shown in FIG. 3, at a repetition rate determined by the frequency of the pulse train produced by oscillator 48. Signal translating circuit 49 also serves to apply firing signals to the thyristors of voltage clamping networks 35cb and 35ba, which signals are, respectively, 120° and 240° out of phase with the firing signals applied to voltage clamping network 35ac. To the end that this may be accomplished, signal translating circuit 49 may comprise frequency dividing or counter circuits of any of the numerous types well-known to those skilled in the art.

Assuming, for a given a-c input voltage and a given d-c output current, that the phase angle between the regulating waves and the polyphase input voltage is such as to establish the desired output voltage at the required output current, oscillator 48 will apply to conductors 52 and 53 a pulse train which has a frequency three times greater than the polyphase input frequency. Under these conditions, signal translating circuit 49 causes regulating network 17 to generate stepped regulating waves which have a frequency equal to the polyphase input frequency. Accordingly, there is no tendency for the phase angle between the polyphase input voltage and the regulating waves to increase or decrease and regulating circuit 10 is in equilibrium.

If, under the above conditions, the current drawn by load 13 should increase, the output voltage between terminals 11 and 12 will decrease and thereby lower the frequency of the pulse train on conductors 52 and 53. This decrease in frequency causes signal translating circuit 49 to reduce the frequency of the firing signals applied to voltage clamping networks 35ac, 35cb and 35ba. The latter decrease in frequency decreases the frequency of the regulating waves and causes the phase angle between the regulating waves and the input voltage to increase. This increase in phase angle, in turn, changes the level of in-phase and reactive current flow through regulating inductors 16A, 16B and 16C until the output voltage rises to its original regulated value at the increased output current. Thus, the latter regulating inductors serve as active regulating elements rather than as, for instance, filter inductors. After the output voltage attains its original regulated value, the circuit of FIG. 1 is in a new equilibrium state since the frequency of the regulating waves is once again equal to the a-c input frequency.

If, on the other hand, current drawn by load 13 should decrease, the d-c output voltage will increase. This increases the frequency of the pulse train generated by oscillator 48 and thereby increases the frequency of the firing signals applied to clamping networks 35ac, 35cb and 35ba. The latter increase, in turn, increases the frequency of the regulating waves and thereby reduces the phase angle between the input voltage and the regulating waves until the level of in-phase and reactive currents through conductors 16A, 16B and 16C change to levels which cause the d-c output voltage to drop to its regulated value. Thereafter, since the frequency of the regulating waves is once again equal to the a-c input frequency, the circuit attains still another equilibrium state.

It will be understood that if, in addition to the above changes in output current, the polyphase a-c input voltage should increase or decrease from the above assumed value, the phase angle between the polyphase input voltage and the regulating waves will change, as required, to compensate both for changes in output current and for changes in input voltage. In particular, changes in the input voltage will be compensated for by changes in quadrature or reactive current flow through network 15 into network 17, these changes in reactive current flow occurring as the changes in output voltage (which result from changes in input voltage) give rise to changes in the regulating wave-input voltage phase angle. At the same time, changes in output current will be compensated for by changes in in-phase current flow through network 15 into load 13, these changes in in-phase current flow occurring as the changes in output voltage (which result from changes in output current) give rise to changes in the regulating wave-input voltage phase angle. Thus, wave generating circuit 17 together with series regulating network 15 and variable frequency control circuit generator 47 provide the desired voltage regulation both with respect to input voltage and with respect to output current.

It will be understood that if regulating circuit 10 is to be utilized as an a-c voltage regulator, diodes 22–27 may be eliminated and windings 18AC, 18CB and 18BA may be connected to suitable a-c loads. In such usage, it may be desirable to set the inductances of inductors such as 37ac and 41ac at values sufficiently large that the transition times of the voltages on windings 18AC', 18CB' and 18BA' are long in relation to the period of the input voltage. This is because long transition times round the waveforms of the regulating waves and thereby cause the output voltage to be more nearly sinusoidal. However, if regulating circuit 10 is to be utilized as a d-c voltage regulator, diodes 22–27 are preferably retained and the inductances of inductors such as 37ac and 41ac are preferably set at values sufficiently small that the transition times of the voltages on windings 18AC', 18CB' and 18BA' are short in relation to the period of the input voltage as, for example, 1 percent thereof. This is because short transition times square up the waveforms of the regulating waves and thereby causes the d-c output voltage to be substantially free of ripple voltage upon rectification by diodes 22–27.

A modified circuit embodying the invention and having fewer thyristors is shown in FIG. 4. The latter circuit is in many respects similar to the circuit of FIG. 1 and like functioning parts are similarly numbered.

The circuit of FIG. 4 differs from that of FIG. 1 principally in the manner in which clamping thyristors 36ac, 36cb and 36ba are commutated. More specifically, in the circuit of FIG. 4, the clamping thyristors are commutated by means of a commutating transformer rather than in the manner described in connection with FIG. 1. In the present embodiment, the commutating transformer includes windings 55ac, 55cb and 55ba which are wound around a common core 55. This commutating transformer operates in connection with commutating capacitors 56ac, 56cb and 56ba, as will now be described.

At time $T_0$ in FIGS. 5a, 5b, 5c and 5d, thyristor 36cb conducts to substantially short circuit transformer winding 18cb. This establishes clamping interval $T_{C1}$ shown in FIG. 5b. At the same time, capacitors 56ac and 56ba are charged to the polarities shown in FIG. 4. Upon the application of firing signals to thyristors 36ac and 58cb, at time $T_1$, thyristor 36ac turns on causing capacitor 56ac to discharge through the path including winding 55ac of commutating transformer 55 and clamping thyristor 36ac. This capacitive discharge induces a voltage on winding 55ac which, through the coupling of common core 55, renders the dotted end of winding 55cb positive from the non-dotted end thereof.

Because, under these conditions, capacitor 56cb is substantially uncharged, the induced voltage across winding 55cb appears in reverse biasing relationship to clamping thyristor 36cb, turning that thyristor off. Thus, the application of firing signals to thyristors 36ac and 58cb, at time $T_1$, turns on thyristor 36ac to initiate clamped interval $T_{C2}$ and turns off thyristor 36cb to terminal clamped interval $T_{C1}$.

After the turn-off of thyristor 36cb, the voltage which is induced on commutating transformer winding 55cb by the discharge of capacitor 56ac causes capacitor 56cb to charge in a resonant manner through the path including winding 55cb, capacitor 56cb, resonant discharge inductor 60cb, and thyristor 58cb. The flow of this resonant charging current results in the transfer from capacitor 56ac to capacitor 56cb of the energy which was initially stored in capacitor 56ac and which was not consumed in the process of commutation. This activity greatly improves the efficiency of commutation. In implementing this resonant energy recovery, inductor 60cb serves as a flywheel to assure complete and virtually lossless energy transfer and thyristor 58cb serves to prevent capacitor 56cb from discharging after it has received substantially all of the stored energy from capacitor 56ac. Thus, inductors 60ac, 60cb and 60ba and thyristors 58ac, 58cb and 58ba afford highly efficient thyristor commutation.

Similar changes in the conductive states of clamping thyristors 36ac, 36cb and 36ba occur at times $T_2$ and $T_3$ when thyristor pairs 36ba-58ac, 36cb-58ba are fired to initiate clamping activity in clamping networks 35ba' and 36cb', respectively. Thereafter, as shown in FIG. 5d, the commutating circuitry of voltage clamping network 35ac', is in the condition in which it was in at time $T_0$. This occurs, in spite of the fact that the polarity of the voltage across winding 18ac at time $T_3$ is opposite to that existing at time $T_0$ because of the rectifying effect of full-wave bridge rectifying network 34ac. Thus, applying firing signals to the thyristors of clamping networks 35ac', 35cb' and 35ba', in the sequence shown in FIG. 6 causes voltage having the waveforms shown in FIGS. 5a, 5b and 5c to appear on transformer windings 18ac, 18cb and 18ca to, in turn, produce the desired regulating voltage waveforms on transformer windings 18AC', 18CB' and 18BA'.

If it is desirable to provide a regulated d-c voltage from a single phase a-c input voltage, this may be accomplished, in accordance with the invention, with either the circuit of FIG. 1 or with the circuit of FIG. 4. The circuit of FIG. 1 may, for example, be converted to a single phase voltage regulator connecting the a-c input voltage across terminals A and C and by eliminating inductors 16B and 16C, windings 18BA, 18BA', 18CB, 18CB', 18ba and 18cb together with the clamping networks that are associated therewith. The circuit of FIG. 4 may be similarly modified so long as provision is made for producing an induced voltage on commutating transformer winding 55ac for purposes of commutation.

In view of the foregoing, it will be seen that in practicing the invention, clamping activity which intially takes place in one clamping network is, in effect, shifted to other clamping networks in a predetermined or programmed sequence to synthesize a regulating voltage wave having a controllable waveform and frequency.

It will be understood that the embodiments described herein are for illustrative purposes only and may be changed or modified without departing from the spirit and scope of the appended claims.

What is claimed is:

1. In a regulting circuit utilizing a regulating wave of controlled harmonic content, in combination, a-c input means, output means, series regulating means for supporting the difference between an unregulated voltage signal at said input means and a regulated voltage at said output means, shunt regulating means for applying to said series regulating means a regulating wave having periodic clamped intervals, means for connecting said shunt regulating means between said series regulating means and said output means, said shunt regulating means including a thyristor for establishing said clamped intervals, control means for generating control signals for turning said thyristor on and off in a predetermined sequence and for controlling the phase angle between said control signals and the voltage signal at said a-c input means in accordance with the voltage at said output means, commutating inductance means, commutating capacitance means and means for electrically connecting said commutating inductance means and said commutating capacitance means to said thyristor to apply commutating voltage and current thereto.

2. In a regulating circuit utilizing a regulating wave of controlled harmonic content, in combination, a-c input means, output means, regulating inductance means for supporting the difference between an unregulated voltage at said input means and a regulated voltage at said output means, means for connecting said regulating inductance means between said a-c input means and said output means, wave generating means for generating a regulating voltage wave having zero voltage intervals of controllable spacing and duration, connecting means for applying the regulating voltage waves generated by said wave generating means to said regulating inductance means, said wave generating means including switching means for initiating and terminating said zero voltage intervals and control means for energizing said switching means in a predetermined sequence at a rate which varies in accordance with the voltage at said output means.

3. A regulating circuit as set forth in claim 5 in which said control means includes controllable oscillator means for generating a signal voltage having a frequency which varies in accordance with the voltage at said output means and signal translating means for firing said switching means in a predetermined sequence at a rate determined by the frequency of said signal voltage.

4. A regulating circuit as set forth in claim 2 in which said output means includes output capacitance means, rectifying means having an a-c input and a d-c input, means for connecting said a-c input to said regulating inductance means and means for connecting said output capacitance means across said d-c output.

5. In a regulating circuit utilizing a regulating wave of controlled harmonic content, in combination, a-c input means, output means, series regulating means for supporting the difference between an unregulated voltage at said a-c input means and a regulated voltage at said output means, means for electrically connecting said series regulating means between said input means and said output means, controllable switching means, means for electrically connecting said switching means in shunt with said series regulating means between said series regulating means and said output means, sensing means for generating a signal voltage having a frequency which is a whole-number multiple of the frequency of the voltage at said a-c input means when the voltage at said output means is at its regulated value and which varies from that whole-number multiple frequency as the voltage at said output means varies from said regulated value, translating means for energizing said controllable switching means in a predetermined sequence at a rate determined by the frequency of said signal voltage and means for electrically connecting said translating means to said switching means and to said sensing means.

6. A regulating circuit as set forth in claim 5 in which said output means includes output capacitance means, rectifying means having an a-c input and a d-c output, means for connecting said a-c input to said series regulating means and means for connecting said output capacitance means across said d-c output.

7. A regulating circuit as set forth in claim 5 which includes commutating inductance means, means for connecting said commutating inductance means in series with said controllable switching means, commutating capacitance means and switching means for electrically connecting said commutating capacitance means to said controllable switching means to apply commutating current and voltage thereto.

8. In a regulating circuit utilizing a regulating wave of controlled harmonic content, in combination, polyphase a-c input means, output means, regulating inductance means, a polyphase coupling transformer having primary winding means and a plurality of electrically isolated secondary winding means, means for connecting said regulating inductance means between said input means and the primary winding means of said coupling transformer, means for connecting said coupling transformer to said output means, a plurality of thyristors for short-circuiting said secondary winding means in a predetermined sequence, control means for generating control signals for energizing said thyristors and for advancing and retarding the phase relationship between said control signals and the voltage at said polyphase a-c input means in accordance with the voltage at said output means, commutating inductance means, commutating capacitance means and means for electrically connecting said commutating inductance means and said commutating capacitance means to said thyristors to apply commutating voltage and current thereto.

9. In a regulating circuit utilizing a regulating wave of controlled harmonic content, in combination, a-c input means, output means, regulating inductance means, means for connecting said regulating inductance means between said input means and said output means, regulating wave generating means having regulating terminal means; said wave generating means including first clamping means for passing a short-circuiting current in a first direction between said regulating terminal means, second clamping means for passing a short-circuiting current in a second direction between said regulating terminal means and means for connecting said clamping means to said regulating terminal means; said wave generating means being adapted to introduce periods of substantially zero voltage into the voltage between said regulating terminal means, means for connecting said regulating terminal means to said inductance means between said inductance means and said output means, control means for generating firing signals for initiating and terminating said periods of substantially zero voltage and for controlling the frequency of said firing signals in accordance with the voltage at said output means, said control means including a controllable oscillator for generating a signal voltage having a frequency which varies in accordance with the voltage at said output means and signal translating means for firing said clamping means in a predetermined sequence at a rate determined by the frequency of said signal voltage.

10. In a regulating circuit utilizing a regulating wave of controlled harmonic content, in combination, a-c input means, output means, regulating inductance means, means for connecting said regulating inductance means between said input means and said output means, regulating wave generating means for generating a regulating wave having a waveform each half-cycle of which includes a plurality of discrete voltage steps, means for connecting said wave generating means to said regulating inductance means said wave generating means including clamping switching means, commutating inductance means, commutating capacitance means, means for connecting said clamping switching means and said commutating inductance means in series, commutating switching means for connecting said commutating capacitance means across said clamping means, discharge inductance means, discharging switching means for connecting said discharge inductance means to said capacitance means to provide a path for the flow of resonant discharge current from and to said commutating capacitance means; and control means for turning said clamping switching means, said commutating switching means and said discharging switching means on and off in a predetermined sequence at a repetition rate determined by the voltage at said output means.

11. In a regulating circuit utilizing a regulating wave of controlled harmonic content, in combination, polyphase a-c input means, output means, regulating inductance means, means for connecting said regulating inductance means between said input means and said output means, polyphase regulating wave generating means for generating a polyphase regulating wave having a multistepped waveform, means for connecting said wave generating means in shunt with said regulating inductance means between said inductance means and said output means; said wave generating means including a plurality of switching means, a commutating transformer having a plurality of windings, a plurality of commutating capacitors, means for connecting said switching means in series with respective windings of said commutating transformer, means for connecting said commutating capacitors in closed circuit relationship with respective switching means and respective windings of said commutating transformer; control means for generating control signals for energizing said switching means in a predetermined sequence and for advancing and retarding the phase angle between said control signals and the voltage at said input means in accordance with the voltage at said output means.

* * * * *

UNITED STATES PATENT OFFICE
CERTIFICATE OF CORRECTION

Patent No. 3,824,443  Dated  July 16, 1974

Inventor(s)  Harold J. Brown

It is certified that error appears in the above-identified patent and that said Letters Patent are hereby corrected as shown below:

In the specification, Column 1, line 34, change "releation" to --relation--. Column 5, line 51, change "thyristor" to --thyristors--. Column 6, line 59, change "cucle" to --cycle--. Column 9, lines 7 and 8, change "terminal" to -- terminate -- .
In the claims, Column 10, line 46, change "5" to --2--.
Column 10, line 57, change "d-c input" to --d-c output--.

Signed and sealed this 22nd day of October 1974.

(SEAL)
Attest:

McCOY M. GIBSON JR.
Attesting Officer

C. MARSHALL DANN
Commissioner of Patents